(12) United States Patent
Park (10) Patent No.: US 7,646,964 B2
(45) Date of Patent: Jan. 12, 2010

(54) REPRODUCTION APPARATUS CONNECTED TO A MONITOR APPARATUS AND REMOTE CONTROLLING METHOD THEREOF

(75) Inventor: Kwang-youn Park, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1833 days.

(21) Appl. No.: 09/793,717

(22) Filed: Feb. 27, 2001

(65) Prior Publication Data

US 2001/0033735 A1    Oct. 25, 2001

(30) Foreign Application Priority Data

Apr. 20, 2000    (KR) ............................... 2000-20995

(51) Int. Cl.
*H04N 5/92* (2006.01)
(52) U.S. Cl. ...................... 386/95; 386/108; 386/83; 386/46; 386/124; 348/734
(58) Field of Classification Search ................. 386/83, 386/146, 46, 124, 108, 95; 348/734
See application file for complete search history.

(56) References Cited

U.S. PATENT DOCUMENTS

| | | | | | |
|---|---|---|---|---|---|
| 5,262,903 | A | * | 11/1993 | Kim | 386/83 |
| 5,270,829 | A | * | 12/1993 | Yang | 386/83 |
| 5,815,631 | A | * | 9/1998 | Sugiyama et al. | 386/46 |
| 5,856,852 | A | * | 1/1999 | Huh | 348/460 |
| 6,366,731 | B1 | * | 4/2002 | Na et al. | 386/83 |
| 6,650,359 | B1 | * | 11/2003 | Park | 348/148 |
| 6,684,025 | B1 | * | 1/2004 | Perlman | 386/83 |
| 7,136,569 | B2 | * | 11/2006 | Cho | 386/46 |
| 2003/0206711 | A1 | * | 11/2003 | Berkheimer et al. | 386/46 |
| 2003/0210900 | A1 | * | 11/2003 | Flannery et al. | 386/125 |

FOREIGN PATENT DOCUMENTS

| | | |
|---|---|---|
| JP | 4-222194 | 8/1992 |
| JP | 4-262699 | 9/1992 |

* cited by examiner

*Primary Examiner*—Thai Tran
*Assistant Examiner*—Helen Shibru
(74) *Attorney, Agent, or Firm*—Staas & Halsey LLP (57) ABSTRACT

A reproduction apparatus and a monitor apparatus are interconnected by one cable connector, which transmits an image and/or audio signal, a first control signal, and a power signal between the reproduction apparatus and the monitor apparatus. A controller in the monitor apparatus generates the first control signal to control the reproduction apparatus and generates a second control signal to control an output unit in the monitor apparatus. The output unit outputs the image and/or the audio signal from the reproduction apparatus as a visual and/or auditory signal in response to the second control signal. A power unit receives the power signal from the reproduction apparatus and supplies power to each component of the monitor apparatus. Thus, the reproduction apparatus and the monitor apparatus can be driven through the monitor apparatus using one remote controller. Similarly, the reproduction apparatus and the monitor apparatus can be driven through the reproduction apparatus using the remote controller.

38 Claims, 9 Drawing Sheets

REPRODUCTION APPARATUS CONNECTED TO A MONITOR APPARATUS AND REMOTE CONTROLLING METHOD THEREOF

CROSS-REFERENCE TO RELATED APPLICATIONS

This application is based upon and claims priority of Korean Patent Application No. 00-20995 filed Apr. 20, 2000, the contents being incorporated herein by reference.

BACKGROUND OF THE INVENTION

1. Field of the Invention

The present invention relates to a system for controlling a reproduction apparatus using a monitor apparatus, and more particularly, to the monitor apparatus connected to the reproduction apparatus and remotely controlling the reproduction apparatus to output image signals and/or audio signals using a connector cable.

2. Description of the Related Art

Figure 1:
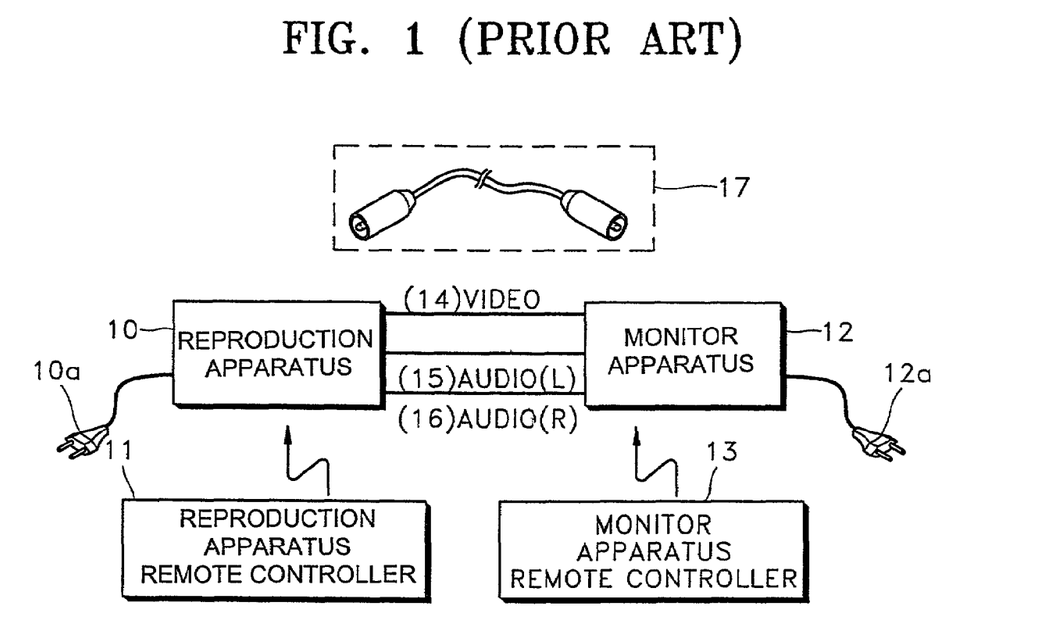
FIG. 1 is a diagram illustrating a conventional system including a reproduction apparatus and a monitor apparatus.

As shown in FIG. 1, a conventional recording and/or reproduction system includes a reproduction apparatus 10 such as video tape recorder (VTR) or digital video (or versatile) disc (DVD) and a monitor apparatus 12. The monitor apparatus 12, which is manufactured independently of the reproduction apparatus 10, converts image and/or audio signals into visual and/or auditory signals. The conventional recording and/or reproduction system includes a power cord 10a attached to the reproduction apparatus 10, a power cord 12a attached to the monitor apparatus 12, a remote controller 11 associated with the reproduction apparatus 10, and a remote controller 13 associated with the monitor apparatus 12. Thus, multiple remote controllers 11, 13 are used to operate the monitor apparatus 12 and the reproduction apparatus 10. Power must be supplied separately to the monitor apparatus 12 and the reproduction apparatus 10. Furthermore, the monitor apparatus 12 and the reproduction apparatus 10 are interconnected using a connection line such as a BNC cable 17, having signal lines 14, 15, and 16, which makes the system cumbersome.

SUMMARY OF THE INVENTION

The present invention has been made to overcome the above-mentioned problems of the related art, and accordingly, it is an object of the present invention to provide for a system including a monitor apparatus; a reproduction apparatus recording and/or reproducing an image and/or audio signal in response to a control signal; a controller in the monitor apparatus generating the control signal controlling the reproduction apparatus and controlling the monitor apparatus to output the image and/or the audio signal as a visual or auditory signal; and a connector supplying the control signal to the reproduction apparatus.

It is another object of the present invention to provide for a monitor apparatus connected to a reproduction apparatus, the monitor apparatus including a connector allowing transmission of an image and/or audio signal and a first control signal between the reproduction apparatus and the monitor apparatus; a manipulation key input unit receiving a manipulation key signal; a remote controller sensor receiving a remote controller sensor signal; and a processing unit selectively receiving the manipulation key signal and the sensor signal and generating therefrom the first control signal controlling the reproduction apparatus, and a second control signal controlling the monitor apparatus to provide the audio and/or image signal from the reproduction apparatus as a visual and/or auditory signal.

It is still another object of the present invention to provide for a reproduction apparatus connected to a monitor apparatus, the reproduction apparatus including a controller generating a control signal; a signal processor outputting an image and/or audio signal in response to the control signal; a power unit outputting a power signal in response to the control signal and supplying power to each component of the reproduction apparatus; a connection cable allowing transmission of signals between the reproduction apparatus and the monitor apparatus, wherein the signals include the image and/or the audio signal, the control signal, and the power signal; and a monitor apparatus receiving the power signal to supply power to each component of the monitor apparatus and outputting the image and/or the audio signal from the reproduction apparatus as a visual and/or auditory signal in response to the control signal.

Accordingly, to achieve the above objects, the present invention provides for a monitor apparatus including a controller generating a remote control signal to a reproduction apparatus to record and/or reproduce an image and/or audio signal, such as a video tape recorder (VTR) or a digital video (or versatile) disc (DVD). The monitor apparatus using a one-cable connector may remotely control the reproduction apparatus. The connector includes a one cable connector including a control signal line to provide the first control signal, a power line to receive the power signal from the reproduction apparatus, and a signal line to provide the image signal and/or the audio signal from the reproduction apparatus to the monitor apparatus.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE PREFERRED EMBODIMENT

Hereinafter, the preferred embodiment of the present invention will be described in greater detail with reference to the accompanying drawings.

Figure 2:
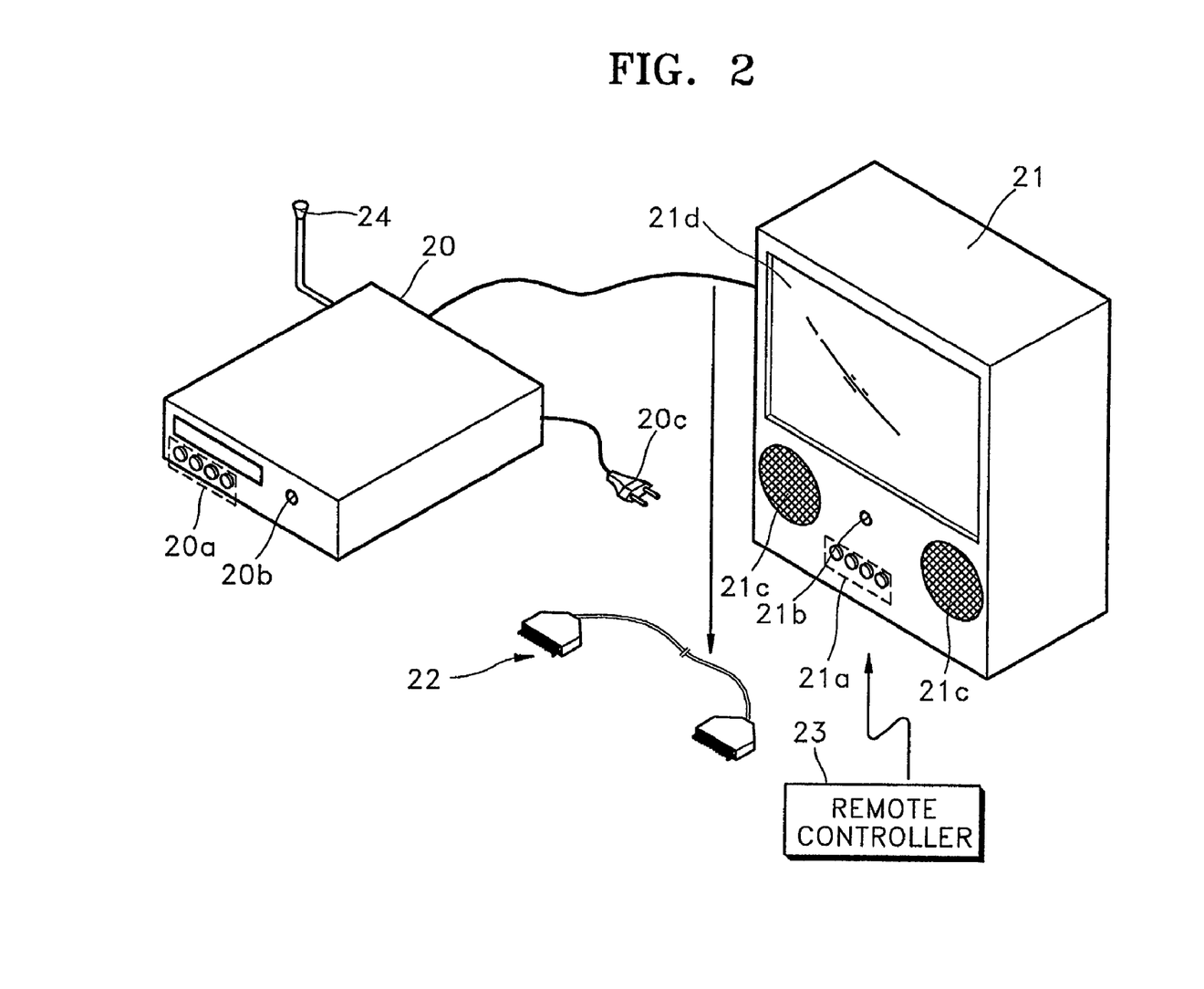
FIG. 2 is a diagram of a recording and/or reproduction system including a reproduction apparatus and a monitor apparatus, in accordance with an exemplary embodiment of the present invention.

FIG. 2 is a diagram of a system including a reproduction apparatus 20 and a monitor apparatus 21, in accordance with an exemplary embodiment of the present invention. The reproduction apparatus 20 is an apparatus, such as a video tape recorder (VTR) or digital video (or versatile) disc (DVD) or any other reproduction medium for reproducing image signals and/or audio signals. The reproduction apparatus 20 reproduces the image signals and/or the audio signals by demodulating either a broadcast signal received from an external antenna 24 or the image and/or the audio signals recorded in a storage medium such as VTR tape or DVD disc. Also, a power cord 20c is attached to the reproduction apparatus 20.

The reproduction apparatus 20 may be controlled from manipulation keys 20a attached to the body of the apparatus 20 or from a remote controller 23 via a first remote controller sensor 20b. The reproduction apparatus 20 may also be controlled from the monitor apparatus 21 via the manipulation keys 21a. Each manipulation key 21a would output a control signal to the reproduction apparatus 20 via a connection cable 22. In the alternative, the remote controller 23 would send the control signal via the second remote controller sensor 21b to the reproduction apparatus 20 using the connection cable 22.

The reproduction apparatus 20 is connected to the monitor apparatus 21 through the connection cable 22, which includes an image and/or audio signal line, a power (DC 12 V) line, and a control signal line. The control signal line allows a user to control the reproduction apparatus 20 remotely through the monitor apparatus 21 or to control the monitor apparatus 21 through the reproduction apparatus 20. The power (DC 12 V) line supplies necessary power from to each component of the reproduction apparatus 20 and the monitor apparatus 40.

The monitor apparatus 21 includes a display 21d to display the image signals and a speaker 21c to output the audio signals. The monitor apparatus 21 may also be controlled from the reproduction apparatus 20 via the manipulation keys 20a. Each manipulation key 20a would output a control signal to the monitor apparatus 21 via the connection cable 22. In the alternative, the remote controller 23 would send the control signal via the first remote controller sensor 20b to the monitor apparatus 21 using the connection cable 22. Further, the monitor apparatus 21 may be controlled from manipulation keys 21a attached to the body of the monitor apparatus 21 or from the remote controller 23 via a second remote controller sensor 21b.

Figure 3:
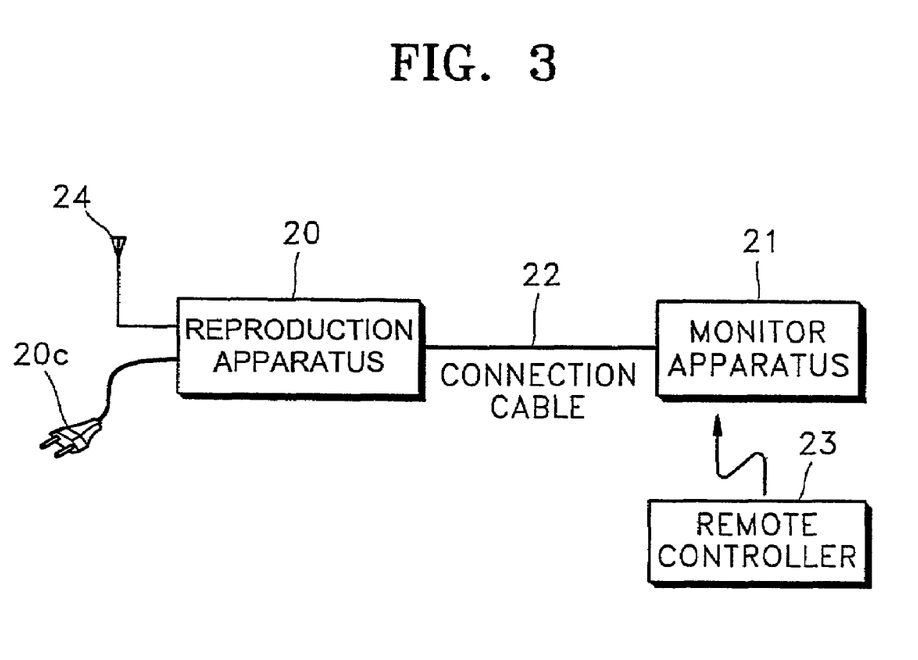
FIG. 3 is a block diagram illustrating the system connection of FIG. 2.

FIG. 3 is a block diagram illustrating the system connection of FIG. 2. Power is supplied to the reproduction apparatus 20 and the monitor apparatus 21 using the power cord 20c. The reproduction apparatus 20 and the monitor apparatus 21 are interconnected by one connection cable 22. Also, the remote controller 23 controls both the reproduction apparatus 20 and the monitor apparatus 21.

Figure 4:
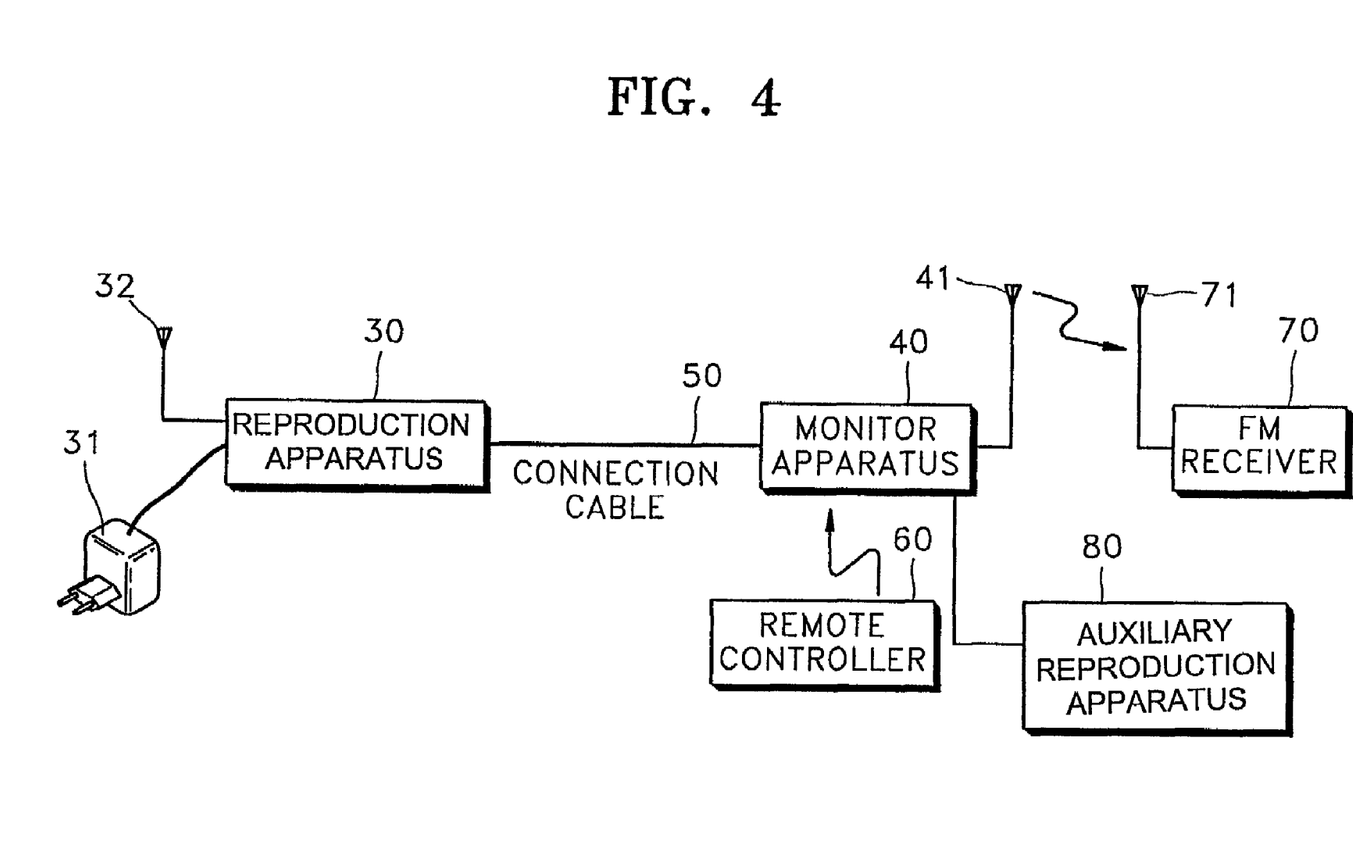
FIG. 4 is a block diagram illustrating the system connection of the reproduction apparatus and the monitor apparatus, in accordance with an alternative exemplary embodiment of the present invention.

FIG. 4 is a block diagram illustrating the system connection of a reproduction apparatus 30 and a monitor apparatus 40, in accordance with an alternative exemplary embodiment of the present invention. Specifically, the system illustrated in FIG. 3 is used in a vehicle. The power cord 20c is replaced with a DC jack 31 connected to the reproduction apparatus 30. The reproduction apparatus 30 records and/or reproduces the image signals and/or the audio signals stored in a storage medium such as VTR tape or DVD disc. In the alternative, the reproduction apparatus 30 demodulates a broadcast signal received from an external antenna 32 and records and/or reproduces therefrom the image signals and/or the audio signals.

A connection cable 50 connects the reproducing apparatus 30 to the monitor apparatus 40 and supplies DC power from the reproduction apparatus 30 to the monitor apparatus 40. The connection cable 50 is a single cable including an image and/or audio signal line, a control signal line, and a power line, thereby making the connection between the reproduction apparatus 30 and the monitor apparatus 40 easy. The reproduction apparatus 30 generates and provides image and/or audio signals to the monitor apparatus 40 via the connection cable 50 using the image and/or audio signal line. If the user controls the reproduction apparatus 30 from the monitor apparatus 40 using the remote controller 60, a control signal from the remote controller 60 would be transmitted from the monitor apparatus 40 to the reproduction apparatus 30 via the connection cable 50 using the control signal line.

Furthermore, the monitor apparatus 40 may be connected to an auxiliary or a second reproduction apparatus 80 which would provide an auxiliary image and/or audio signals to the monitor apparatus 40 to display the auxiliary image signals and/or to output the auxiliary audio signals. The monitor apparatus 40 may also provide for a circuit (not shown) that FM modulates the audio signals and sends the FM modulated audio signals via a transmitting antenna 41 to an FM radio receiver 70 installed in the vehicle. The monitor apparatus 40 would then display the image signals and output the audio signals from either the reproduction apparatus 30 or the auxiliary reproduction apparatus 80 through a speaker (not shown) on the monitor apparatus 40 and/or via the receiving antenna 71 to the FM radio receiver 70 via the FM receiving antenna 71.

Figure 5:
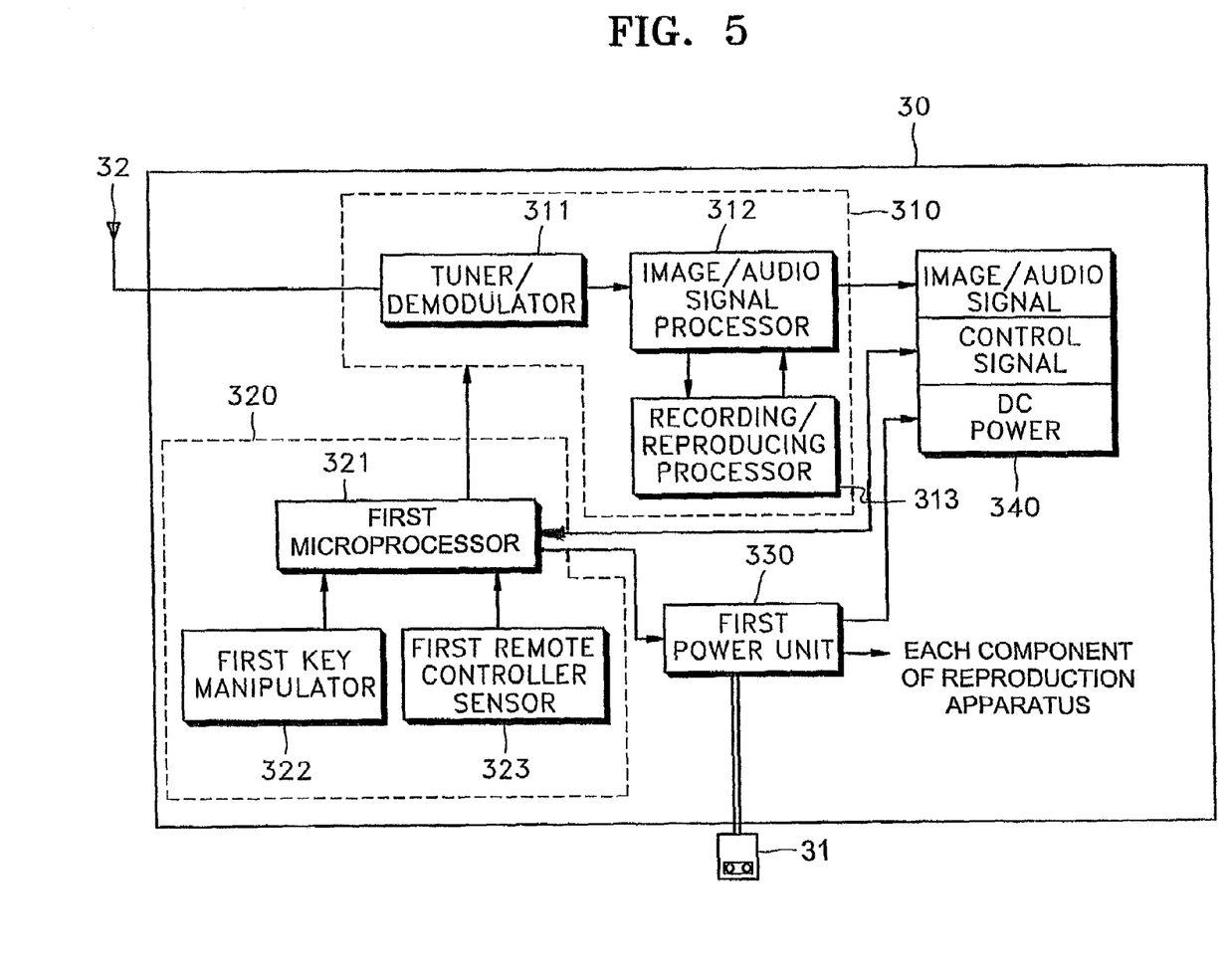
FIG. 5 is a block diagram illustrating the reproduction apparatus illustrated in FIG. 4.

FIG. 5 illustrates a detailed block diagram of the reproduction apparatus 30, shown in FIG. 4. The reproduction apparatus 30 includes a signal processor 310, a first controller 320, a first power unit 330, and a first connector 340. The signal processor 310 records and/or reproduces the image and/or the audio signals. The first power unit 330 receives DC power through a power jack 31 and supplies power to each component of the reproduction apparatus 30. In an exemplary embodiment, the first power unit 330 may operate so that DC power may be provided to the monitor apparatus 40 through the first connector 340 although the reproduction apparatus 30 may not be operating, as shown in FIG. 4.

The first controller 320 controls the signal processor 310, the first power unit 330, and the first connector 340 of the reproduction apparatus 30. The first connector 340 allows transmission of the image and/or the audio signals from the signal processor 310, the DC power from the first power unit 30, and a control signal between the first controller 320 and the monitor apparatus 40 (to be later described).

The signal processor 310 includes a tuner/demodulator 311, an image/audio signal processor 312, and a recording reproducing/processor 313. The tuner/demodulator 311 demodulates RF signals received through the antenna 32 and outputs the image and/or audio signals. The image/audio signal processor 312 processes the image and/or the audio signals and provides the processed image and/or audio signals to the first connector 340. The image/audio signal processor 312 may also provide a signal to the recording/reproducing processor 313 to record and/or to reproduce the image and/or the audio signals in the storage medium such as a VTR tape or a DVD disc.

The first controller 320 includes a first microprocessor 321, a first key manipulator 322, and a first remote controller sensor 323. The first manipulation key 322 includes at least one key, which is attached to the body of the reproduction apparatus 30, and generates a first manipulation key signal input by the user to the first microprocessor 321. In the alternative, the first remote controller sensor 323 receives a remote controller sensor signal from the remote controller 60 and outputs the control signal to the first microprocessor 321. The first microprocessor 321 receives either the first manipulation key signal or the remote controller sensor signal and generates a control signal. The first microprocessor 321 then controls the signal processor 310, the first power unit 330, and the first connector 340 in response to the control signal received from either the first manipulation key 322 or the first remote controller sensor 323. Further, the first microprocessor 321 may also control the signal processor 310, the first power unit 330, and the first connector 340 using a control signal from the monitor apparatus 40, to be later described. Furthermore, the first microprocessor 321 provides the control signal to the monitor apparatus 40 of FIG. 6, to be later described, via the first connector 340. Thus, the monitor apparatus 40 and each component of the reproduction apparatus 30 are controlled using the first controller 320.

Figure 6:
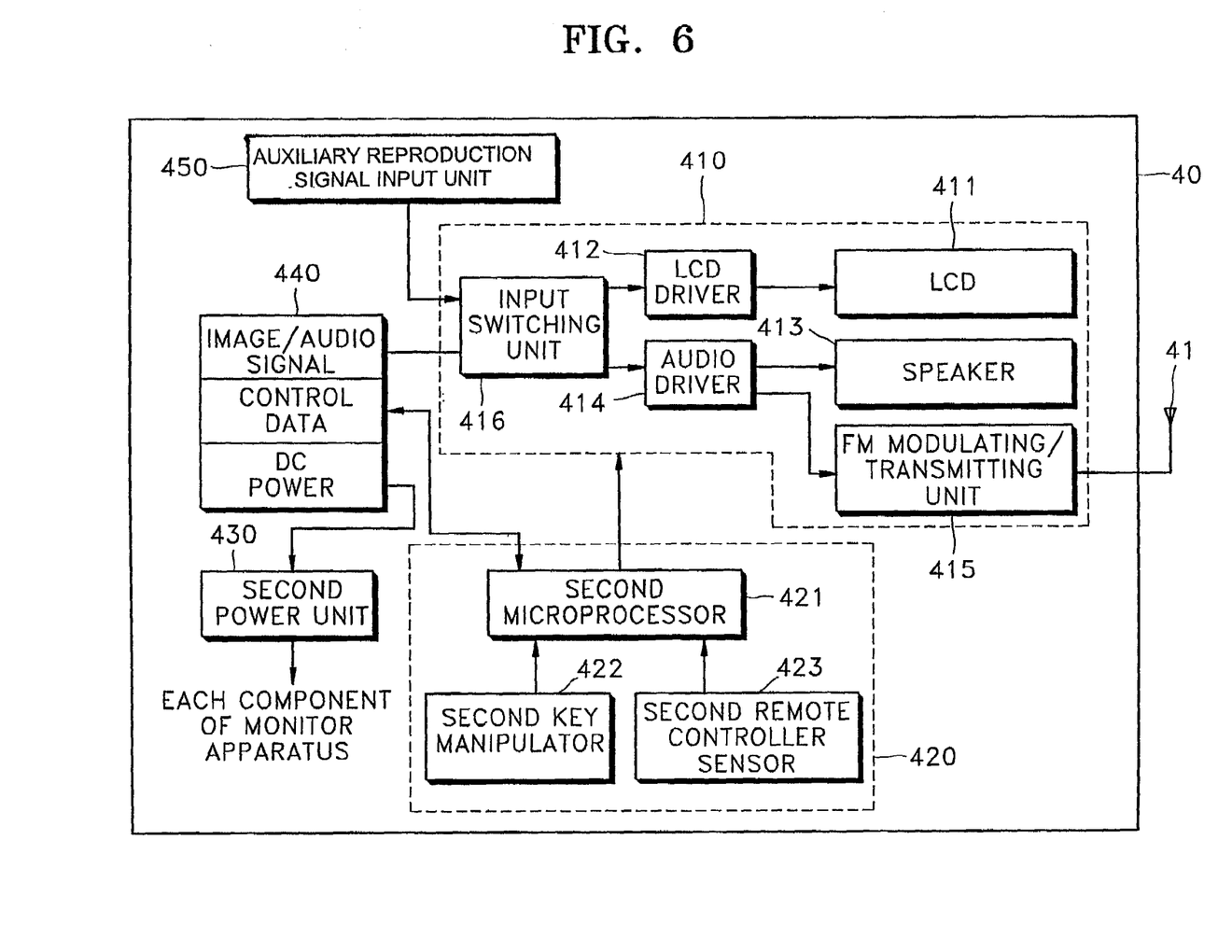
FIG. 6 is a block diagram illustrating the monitor apparatus illustrated in FIG. 4.

FIG. 6 is a block diagram illustrating the monitor apparatus illustrated in FIG. 4. The monitor apparatus 40 includes an output unit 410, a second controller 420, a second power unit 430, a second connector 440, and a second reproduction signal input unit 450. Similar to the first connector 340 of FIG. 5, the second connector 440 allows transmission of the image and/or the audio signals, the control signal, and the DC power between the reproduction apparatus 30 and the monitor apparatus 40. Specifically, the first connector 340 of FIG. 5 outputs the processed image and/or audio signals, the control signal, and the DC power via the connection cable 50 of FIG. 4 to the second connector 440. In turn, the second connector 440 outputs the image and/or the audio signals to the output unit 410, a control signal to the second controller 420, and the DC power to the second power unit 430. The second power unit 430 receives the DC power and supplies the necessary power to each component of the monitor apparatus 40. Further, the second reproduction signal input unit 450 receives the image and/or the audio signals from the second reproduction apparatus 80, as shown in FIG. 4.

The output unit 410 includes an input switching unit 416, an LCD driver 412, an LCD 411, an audio driver 414, a speaker 413, and a FM modulating/transmitting unit 415. The input switching unit 416, in response to the control signal from the second controller 420, selects either the image and/or the audio signals received from the second reproduction signal input unit 450 or the image and/or the audio signals received from the second connector 440. The liquid crystal display (LCD) driver 412 displays the image signals from the input switching unit 416 on the LCD 411. The audio driver 414 drives the speaker 413 to output the audio signals from the input switching unit 416. In addition, the audio driver 414 drives the FM modulating/transmitting unit 415 to modulate the audio signals and to transmit the modulated audio signals through the antenna 41.

The second controller 420 includes a second microprocessor 421, a second manipulation key 422, and a second remote controller sensor 423. The second manipulation key 422 is attached to the body of the monitor apparatus 40. The second controller 420 controls the output unit 410, the second connector 440, and the second power unit 430 in response to the control signal received and processed by the second microprocessor 421. The control signal may be generated from either a key manipulation signal received from the second key manipulator 422, a remote controller manipulation signal received from the second remote controller sensor 423, or the control signal provided from the reproduction apparatus 30 through the second connector 440.

The user may control the monitor apparatus 40 from the reproduction apparatus 30 using the remote controller 60 or using the first manipulation key 322. Specifically, the first microprocessor 321 would receive a control signal from the first key manipulator 322 or from the first remote controller sensor 323. The first controller 320 would then output the control signal to the output unit 310 to output the image and/or the audio signals from the reproduction apparatus 30 (i.e., the signal processor 310) as visual and/or auditory signals. The first controller 320 would also send the control signal to the first connector 340 of FIG. 5. The first connector 340 would then transmit the control signal to the second connector 440 of FIG. 6. The second connector 440 would send the control signal from the first controller 320 to the second microprocessor 421 in the second controller 420 to drive the output unit 410. The output unit 410, in response to the control signal from the second controller 420, would then output the image and/or the audio signals from the auxiliary reproduction signal input unit 450 or from the signal processor 310 as visual and/or auditory signals.

In the alternative, the user may control the reproduction apparatus 30 from the monitor apparatus 40 using the remote controller 23 or using the second manipulation key 422. Specifically, the second microprocessor 421 would receive a control signal from the second key manipulator 422 or from the second remote controller sensor 423. The second microprocessor 421 would send the control signal to the second connector 440. The second connector 440 would then transmit the control signal, via the connection cable 50, to the first connector 340 of FIG. 5. The first connector 340 would send the control signal to the first microprocessor 321 in the first controller 320 to drive the signal processor 310 to output the image and/or audio signals. Further, the first power unit 330 would output the power signal to the second power unit 430 via the second connector 440 to supply power to each component of the monitor apparatus 40. The output unit 410, in response to the control signal from the second controller 420, would then output the image and/or the audio signals from the auxiliary reproduction signal input unit 450 or from the signal processor 310 as visual and/or auditory signals.

Figure 7:
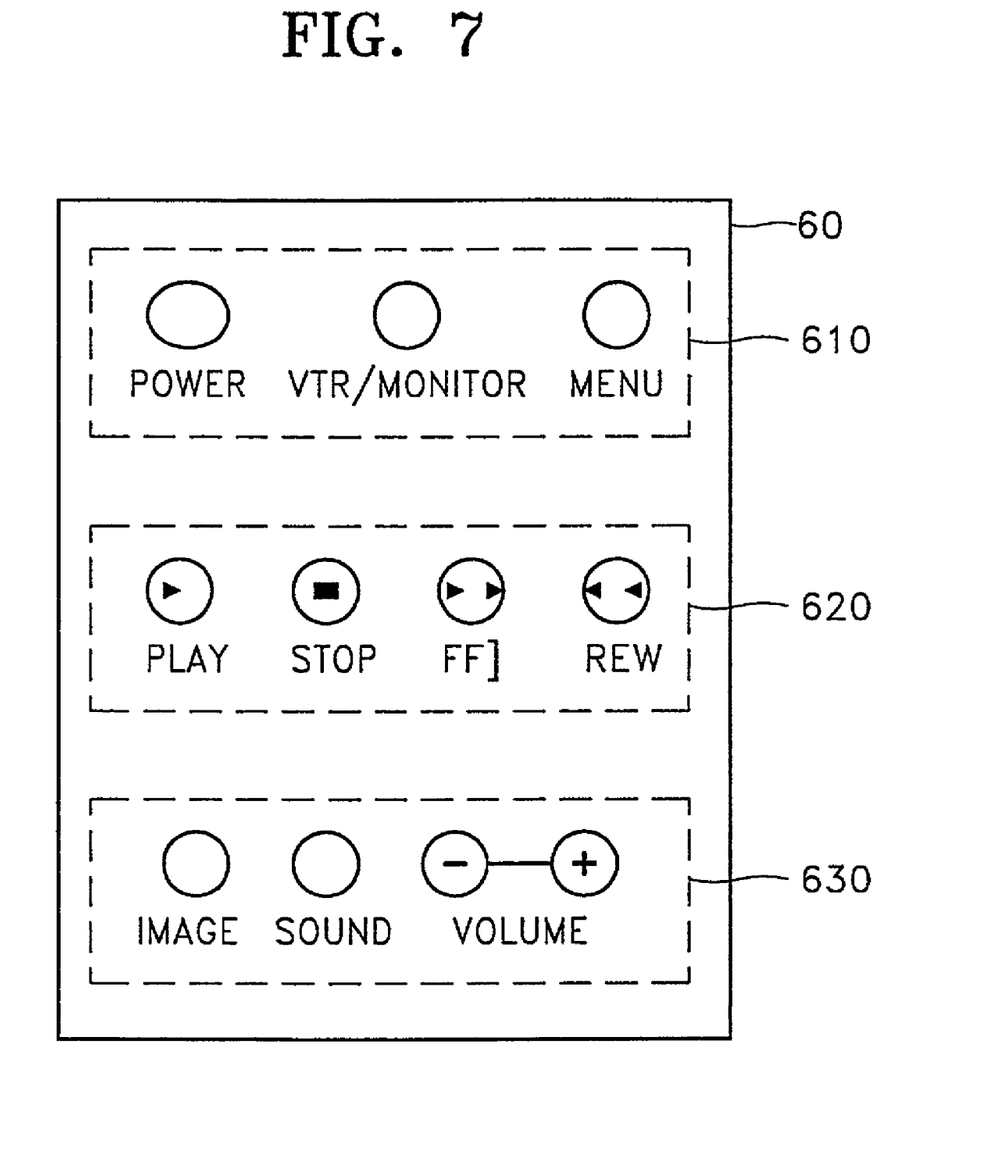
FIG. 7 is a diagram illustrating a remote controller, in accordance with an exemplary embodiment of the present invention.

FIG. 7 is a diagram illustrating a remote controller 60, in accordance with an exemplary embodiment of the present invention. The remote controller 60 includes a group of common function keys 610 such as "power," "VTR/monitor," and "menu" commonly used for the reproduction apparatus 30 and the monitor apparatus 40. The remote controller 60 also includes a group of reproduction apparatus keys 620 such as "play," "stop," "fast-forward," (FF) and "rewind" (REW) to specifically control the VTR, and a group of monitor apparatus keys 630 such as "image," "sound," "volume(−)," and "volume(+)" to specifically control the monitor apparatus 40.

The operating mode of the remote controller 60 is determined as either "VTR" or "monitor" depending on the user's selection of the "VTR/monitor" key. The remote controller 60 outputs a data code corresponding to either "VTR" or "monitor." For example, if the "VTR/monitor" key is set as "monitor," data corresponding to "power" and "menu" keys is formatted as the same recognition code as the group of monitor apparatus keys 630 and is used only as a signal to drive the monitor apparatus 40. Unlike the group of common function keys 610, the group of reproduction apparatus keys 620 is formatted as a recognition code corresponding to the VTR 30 independent of whether the VTR/monitor key is set as "VTR" or "monitor." The group of reproduction apparatus keys 620 is only used for driving the VTR 30. Similarly, the monitor apparatus keys 630 are only used to drive the monitor apparatus 40 independent of whether the VTR/monitor key is set as "VTR" or "monitor."

Figure 8:
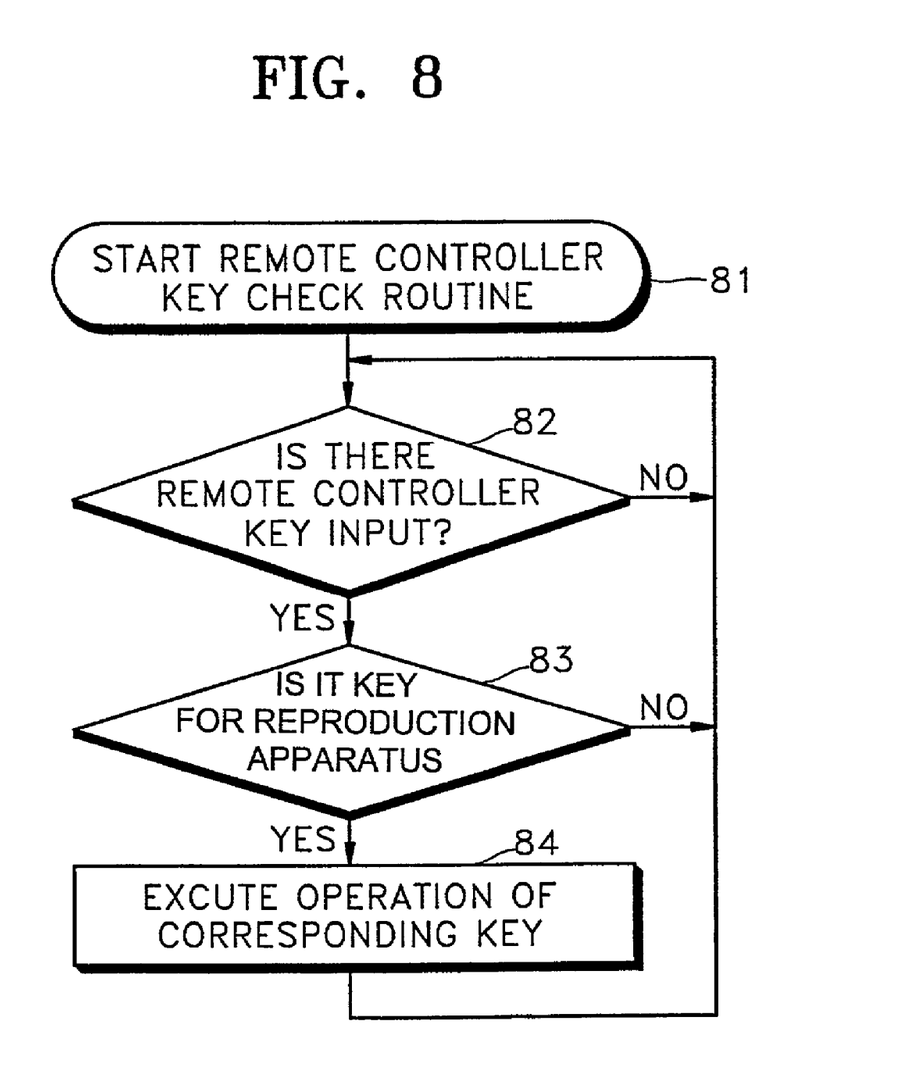
FIG. 8 is a flow chart illustrating a process performing signal processing of a remote control signal from the reproduction apparatus, in accordance with an exemplary embodiment of the present invention.

FIG. 8 is a flow chart illustrating a process performing signal processing of a remote control signal from the reproduction apparatus 30, in accordance with an exemplary embodiment of the present invention. At operation 81, a remote controller key check routine begins and memories are cleared, initial flag conditions are set, etc., as is well known in the art. At operation 82, a determination is made as to whether there is a remote controller key input. If there is a remote controller key input, then at operation 83, a determination is made as to whether the input remote controller data is data for the reproduction apparatus 30 formatted as a recognition code of the reproduction apparatus 30. If the key is for the reproduction apparatus 30, then at operation 84, the corresponding key is executed. The process returns to operation 82. However, if the key is not for the reproduction apparatus 30, then the process returns to operation 82.

Figure 9:
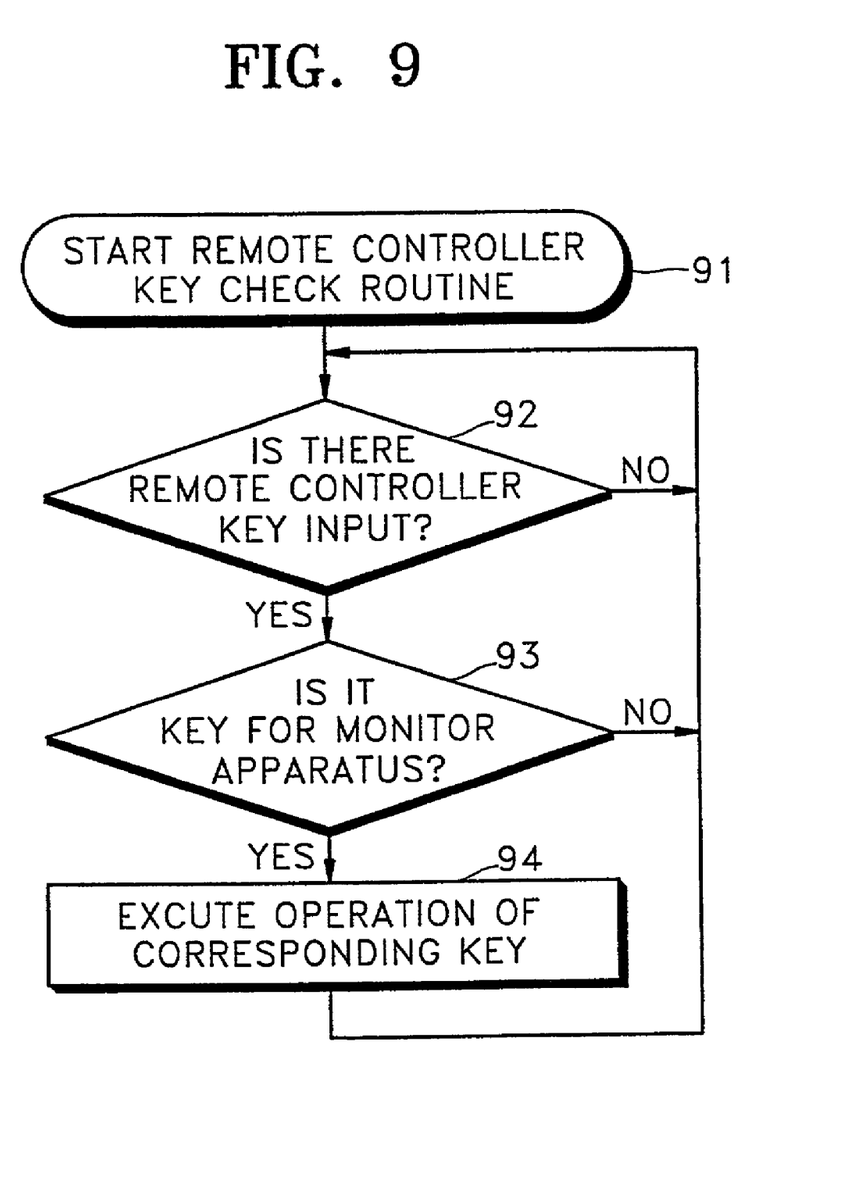
FIG. 9 is a flow chart illustrating a process performing signal processing of a remote control signal from the monitor apparatus, in accordance with an exemplary embodiment of the present invention.

FIG. 9 is a flow chart illustrating a process performing signal processing of a remote control signal from the monitor apparatus 40, in accordance with an exemplary embodiment of the present invention. At operation 91, a remote controller key check routine begins and memories are cleared, initial flag conditions are set, etc., as is well known in the art. At operation 92, a determination is made as to whether there is a remote controller key input. If there is a remote controller key input, then at operation 93, a determination is made as to whether the input remote controller data is data for the monitor apparatus 40 formatted as a recognition code of the monitor apparatus 40. If the key is for the monitor apparatus 40, then at operation 94, the corresponding key is executed. The process returns to operation 92. However, if the key is not for the monitor apparatus 40, then the process returns to operation 92.

As described above, the reproduction apparatus 30 and the monitor apparatus 40 may be driven through the monitor apparatus 40 using one remote controller. Furthermore, it is possible to control the monitor apparatus 40 through the reproduction apparatus 30. Thus, the present invention facilitates manipulation of a system in which the reproduction apparatus is connected to the monitor apparatus.

Furthermore, according to the present invention, the reproduction apparatus is connected to the monitor apparatus by one connection cable including a power line, a control signal line, and an image/audio signal line, thereby allows for simple installation of both apparatuses. In particular, if the reproduction apparatus, in accordance with the present invention, is used as a media reproduction apparatus in a vehicle, the reproduction apparatus may be controlled from the monitor apparatus and the reproduction apparatus may be hidden in a place such as a trunk or a seat.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A monitor apparatus connected to a reproduction apparatus, the monitor apparatus comprising:

a connector allowing transmission of an image and/or audio signal, a first control signal between the reproduction apparatus and the monitor apparatus, and a power signal transmitted from the reproduction apparatus;

a manipulation key input unit receiving a manipulation key signal;

a remote controller sensor receiving a remote controller sensor signal; and a processing unit in the monitor apparatus selectively receiving the manipulation key signal and the sensor signal and generating therefrom the first control signal controlling the reproduction apparatus and a second control signal controlling the monitor apparatus to provide the audio and/or image signal from the reproduction apparatus as a visual and/or auditory signal.

2. The monitor apparatus as recited in claim 1, further comprising an auxiliary reproduction signal input unit generating an auxiliary image and/or audio signal.

3. The monitor apparatus as recited in claim 2, further comprising an output unit which, in response to the second control signal, selects either the Image and/or the audio signal from the reproduction apparatus or the auxiliary image and/or the audio signal from the auxiliary reproduction signal input unit to provide the visual and/or auditory signal.

4. The monitor apparatus as recited in claim 1, further comprising a power unit receiving the power signal from the reproduction apparatus through the connector and supplying power to each component of the monitor apparatus.

5. The monitor apparatus as recited in claim 1, wherein the reproduction apparatus either records and/or reproduces the image signals and/or the audio signals stored in a storage medium or demodulates a broadcast signal received from an external antenna to record and/or reproduce therefrom the image signals and/or the audio signals.

6. The monitor apparatus as recited in claim 1, wherein the reproduction apparatus comprises a power unit supplying power to each component of the reproduction apparatus.

7. A monitor apparatus connected to a reproduction apparatus, the monitor apparatus comprising:

a connector allowing transmission of signals between the reproduction apparatus and the monitor apparatus, wherein the signals comprise an image and/or audio signal, a first control signal, and a power signal transmitted from the reproduction apparatus;

a controller in the monitor apparatus generating the first control signal to control the reproduction apparatus and a second control signal to control the monitor apparatus;

a power unit receiving the power signal from the reproduction apparatus through the connector and supplying power to each component of the monitor apparatus; and an output unit outputting the image and/or the audio signal from the reproduction apparatus as a visual and/or auditory signal in response to the second control signal.

8. The monitor apparatus as recited in claim 7, further comprising an auxiliary reproduction signal input unit generating an auxiliary image and/or audio signal.

9. The monitor apparatus as recited in claim 8, wherein the output unit further comprises an input switching unit selectively outputting the image and/or the audio signal from the reproduction apparatus and the auxiliary image and/or the audio signal from the auxiliary reproduction signal input unit as the visual and/or auditory signal in response to the second control signal.

10. The monitor apparatus as recited in claim 7, wherein the controller comprises a manipulation key input unit receiving a manipulation key signal;

a remote controller sensor receiving a remote controller sensor signal; and a processor selectively receiving the manipulation key signal and the remote controller sensor signal and generating therefrom the first control signal and the second control signal.

11. The monitor apparatus as recited in claim 7, wherein the reproduction apparatus either records and/or reproduces the image signals and/or the audio signals stored in a storage medium or demodulates a broadcast signal received from an external antenna to record and/or reproduce therefrom the image signals and/or the audio signals.

12. The monitor apparatus as recited in claim 7, wherein the output unit comprises a frequency modulation (FM) converter that converts the audio signal to an FM modulated radio signal.

13. The monitor apparatus as recited in claim 7, wherein the connector comprises a one cable connector comprising a control signal line to provide the first control signal, a power line to receive the power signal from the reproduction apparatus, and a signal line to provide the image signal and/or the audio signal from the reproduction apparatus to the monitor apparatus.

14. A monitor apparatus connected to a reproduction apparatus, the monitor apparatus comprising:
  a connector allowing transmission of signals between the reproduction apparatus and the monitor apparatus, wherein the signals comprise an image and/or audio signal, a first control signal, and a power signal transmitted from the reproduction apparatus;
  a manipulation key Input unit receiving a manipulation key signal;
  a remote controller sensor receiving a remote controller sensor signal;
  a processor selectively receiving the manipulation key signal and the remote controller sensor signal and generating therefrom the first control signal to control the reproduction apparatus and a second control signal to control the monitor apparatus;
  a power unit receiving the power signal from the reproduction apparatus through the connector and supplying power to each component of the monitor apparatus;
  an auxiliary reproduction unit outputting an auxiliary image and/or audio signal; and
  an output unit selectively outputting the audio and/or image signal and the auxiliary audio and/or image signal as a visual and/or auditory signal in response to the second control signal, wherein the output unit comprises a frequency modulation (FM) converter that converts the audio signal to an FM modulated radio signal.

15. The monitor apparatus as recited in claim 14, wherein the reproduction apparatus either records and/or reproduces the image signals and/or the audio signals stored in a storage medium or demodulates a broadcast signal received from an external antenna to record and/or reproduce therefrom the image signal and/or the audio signal.

16. The monitor apparatus as recited in claim 14, wherein the connector comprises a one cable connector comprising a control signal line to provide the first control signal, a power line to receive the power signal from the reproduction apparatus, and a signal line to provide the image signal and/or the audio signal from the reproduction apparatus to the monitor apparatus.

17. A media reproduction system, comprising:
  a reproduction apparatus comprising
    a controller generating a control signal,
    a signal processor outputting an image and/or audio signal in response to the control signal,
    a power unit outputting a power signal in response to the control signal and supplying power to each component of the reproduction apparatus;
  a monitor apparatus connected to the reproduction apparatus and receiving the power signal to supply power to each component of the monitor apparatus and outputting the image and/or the audio signal from the reproduction apparatus as a visual and/or auditory signal in response to the control signal; and
  a connection cable allowing transmission of signals between the reproduction apparatus and the monitor apparatus, wherein the signals comprise the image and/or the audio signal, the control signal, and the power signal transmitted to the monitor apparatus.

18. The reproduction apparatus as recited in claim 17, wherein the controller comprises;
  a manipulation key input unit receiving a manipulation key signal;
  a remote controller sensor receiving a remote controller sensor signal; and
  a processor selectively receiving the manipulation key signal and the remote controller sensor signal and generating therefrom the control signal.

19. The reproduction apparatus as recited in claim 17, wherein the connector comprises a one cable connector comprising a control signal line to provide the first control signal, a power line to receive the power signal from the reproduction apparatus, and a signal line to provide the image signal and/or the audio signal from the reproduction apparatus to the monitor apparatus.

20. The reproduction apparatus as recited in claim 17, wherein the power unit supplies direct current (DC) power.

21. A media reproduction system, comprising:
  a monitor apparatus;
  a reproduction apparatus recording and/or reproducing an image and/or audio signal in response to a control signal;
  a controller in the monitor apparatus generating the control signal controlling the reproduction apparatus and controlling the monitor apparatus to output the image and/or the audio signal as a visual or auditory signal; and
  a connector supplying the control signal to the reproduction apparatus and a power signal transmitted to the monitor apparatus.

22. The system as recited in claim 21, wherein the controller comprises:
  a manipulation key input unit receiving a manipulation key signal;
  a remote controller sensor receiving a remote controller sensor signal; and
  a processor selectively receiving the manipulation key signal and the remote controller sensor signal and generating therefrom the control signal to control the reproduction apparatus and the monitor apparatus.

23. The system as recited in claim 21, wherein the monitor apparatus further comprises:
  a power unit receiving the power signal from the reproduction apparatus and supplying power to each component of the monitor apparatus;
  an auxiliary reproduction unit outputting an auxiliary image and/or audio signal; and
  an output unit selectively outputting the audio and/or image signal and the auxiliary audio and/or image signal as a visual and/or auditory signal in response to the second control signal, wherein the output unit comprises a frequency modulation (FM) converter that converts the audio signal to an FM modulated radio signal.

24. A media reproducing system, comprising:
a reproduction apparatus recording and/or reproducing an image signal and/or the audio signal in response to a control signal and comprising a direct current (DC) jack to receive DC power provided by a vehicle;
a monitor apparatus comprising a controller in the monitor apparatus generating the control signal controlling the reproduction apparatus and controlling the monitor apparatus to output the image and/or the audio signal as a visual or auditory signal; and
a one cable connector comprising a control signal line providing the control signal generated by the monitor apparatus to the reproduction apparatus, a power line receiving power operating the monitor apparatus from the reproduction apparatus. and a signal line providing the image signal and/or the audio signal generated by the reproduction apparatus to the monitor apparatus.

25. The system as recited in claim 24, wherein the controller comprises:
a manipulation key input unit receiving a manipulation key signal;
a remote controller sensor receiving a remote controller sensor signal; and
a processor selectively receiving the manipulation key signal and the remote controller sensor signal and generating therefrom the control signal to control the reproduction apparatus and the monitor apparatus.

26. The system as recited in claim 24, wherein the monitor apparatus further comprises:
a power unit receiving the power signal from the reproduction apparatus and supplying power to each component of the monitor apparatus;
an auxiliary reproduction unit outputting an auxiliary image and/or audio signal; and
an output unit selectively outputting the audio and/or image signal and the auxiliary audio and/or image signal as a visual and/or auditory signal in response to the second control signal. wherein the output unit comprises a frequency modulation (FM) converter that converts the audio signal to an FM modulated radio signal.

27. A media reproduction system, comprising:
monitor means;
reproduction means for recording and/or reproducing an image and/or audio signal in response to a control signal;
controlling means in the monitor means for generating the control signal controlling the reproduction means and controlling the monitor means to output the image and/or the audio signal as a visual or auditory signal; and
connecting means for supplying the control signal to the reproduction means and a power signal transmitted to the monitor means.

28. The system as recited in claim 27. wherein the controller comprises:
manipulation key input means for receiving a manipulation key signal;
remote controller sensing means for receiving a remote controller sensor signal; and
processing means for selectively receiving the manipulation key signal and the remote controller sensor signal and generating therefrom the control signal to control the reproduction means and the monitor means.

29. The system as recited in claim 27, wherein the monitor means further comprises:

power means for receiving the power signal from the reproduction means and supplying power to each component of the monitor means;
auxiliary reproduction means for outputting an auxiliary image and/or audio signal; and
outputting means for selectively outputting the audio and/or image signal and the auxiliary audio and/or image signal as a visual and/or auditory signal in response to the second control signal, wherein the outputting means comprises frequency modulation (FM) converting means for converting the audio signal to an FM modulated radio signal.

30. A media reproducing system, comprising:
reproduction means for recording and/or reproducing an image signal and/or the audio signal in response to a control signal and comprising a direct current (DC) means to receive DC power provided by a vehicle;
monitor means comprising controlling means in the monitor means for generating the control signal controlling the reproduction means and controlling the monitor means to output the image and/or the audio signal as a visual or auditory signal; and
one cable connecting means comprising control signal line means for providing the control signal generated by the monitor means to the reproduction means, power line means for receiving power operating the monitor means from the reproduction means, and signal line means for providing the image signal and/or the audio signal generated by the reproduction means to the monitor means.

31. The system as recited in claim 30, wherein the controller comprises:
manipulation key input means for receiving a manipulation key signal;
remote controller sensing means for receiving a remote controller sensor signal; and
processing means for selectively receiving the manipulation key signal and the remote controller sensor signal and generating therefrom the control signal to control the reproduction means and the monitor means.

32. The system as recited in claim 30, wherein the monitor means further comprises:
power means for receiving the power signal from the reproduction means and supplying power to each component of the monitor means;
auxiliary reproduction means for outputting an auxiliary image and/or audio signal; and
outputting means for selectively outputting the audio and/or image signal and the auxiliary audio and/or image signal as a visual and/or auditory signal in response to the second control signal, wherein the outputting means comprises frequency modulation (FM) converting means for converting the audio signal to an FM modulated radio signal.

33. A method for controlling a monitor apparatus connected to a reproduction apparatus, the method comprising:
selectively receiving a manipulation key signal and a remote controller sensor signal in the monitor apparatus and generating therefrom a first control signal to control the reproduction apparatus and a second control signal to control the monitor apparatus;
receiving an image and/or audio signal from the reproduction apparatus;
receiving a power signal from the reproduction apparatus in response to the first control signal to supply power to each component of the monitor apparatus;
receiving an auxiliary image and/or audio signal; and selectively outputting the audio and/or image signal and the auxiliary audio and/or image signal as a visual and/or auditory signal in response to the second control signal from the monitor apparatus.

34. The monitor apparatus as recited in claim 33, demodulating a broadcast signal received from an external antenna to record and/or reproduce therefrom the image signals and/or the audio signals.

35. A method for controlling a monitor apparatus connected to a reproduction apparatus, the method comprising:
selectively receiving a manipulation key signal and a remote controller sensor signal in the reproduction apparatus and generating therefrom a control signal to control the reproduction apparatus and the monitor apparatus;
outputting an image and/or audio signal from the reproduction apparatus in response to the control signal;
supplying power to each component of the reproduction apparatus;
receiving a power signal from the reproduction apparatus in response to the control signal to supply power to each component of the monitor apparatus;
receiving an auxiliary image and/or audio signal; and
selectively outputting the audio and/or image signal and the auxiliary audio and/or image signal as a visual and/or auditory signal in response to the control signal from the reproduction apparatus.

36. The monitor apparatus as recited in claim 35, demodulating a broadcast signal received from an external antenna to record and/or reproduce therefrom the image signals and/or the audio signals.

37. A method for controlling a reproduction apparatus connected to a monitor apparatus, the method comprising:
controlling the reproduction apparatus and the monitor apparatus using either a first control signal from the reproduction apparatus or a second control signal from the monitor apparatus;
outputting an image and/or audio signal from the reproduction apparatus in response to one of the control signals;
supplying power to each component of the reproduction apparatus;
receiving a power signal from the reproduction apparatus in response to either the first control signal or the second control signal to supply power to each component of the monitor apparatus;
receiving an auxiliary image and/or audio signal; and
selectively outputting the audio and/or image signal and the auxiliary audio and/or image signal as a visual and/or auditory signal in response to either the first control signal or the second control signal.

38. A method for controlling a reproduction apparatus connected to a monitor apparatus, the method comprising:
selectively receiving a manipulation key signal and a remote controller sensor signal in the reproduction apparatus and generating therefrom a first control signal;
selectively receiving a manipulation key signal and a remote controller sensor signal in the monitor apparatus and generating therefrom a second control signal;
controlling the reproduction apparatus and the monitor apparatus using either the first control signal or the second control signal;
outputting an image and/or audio signal from the reproduction apparatus in response to one of the control signals;
receiving a power signal from the reproduction apparatus in response to either the first control signal or the second control signal to supply power to each component of the monitor apparatus;
receiving an auxiliary image and/or audio signal; and
selectively outputting the audio and/or image signal and the auxiliary audio and/or image signal as a visual and/or auditory signal in response to either the first control signal or the second control signal.

* * * * *

UNITED STATES PATENT AND TRADEMARK OFFICE
CERTIFICATE OF CORRECTION

PATENT NO. : 7,646,964 B2
APPLICATION NO. : 09/793717
DATED : January 12, 2010
INVENTOR(S) : Kwang-youn Park It is certified that error appears in the above-identified patent and that said Letters Patent is hereby corrected as shown below:

Column 8, Line 21, change "Image" to --image--.

Column 9, Line 31, change "Input" to --input--.

Column 10, Line 18, change "comprises;" to --comprises:--.

Column 11, Line 17, change "apparatus." to --apparatus,--.

Column 11, Line 40, change "signal." to --signal,--.

Column 11, Line 54, change "27." to --27,--.

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO.       : 7,646,964 B2                                                       Page 1 of 1
APPLICATION NO.  : 09/793717
DATED            : January 12, 2010
INVENTOR(S)      : Kwang-youn Park It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2182 days.

Signed and Sealed this

Twenty-eighth Day of December, 2010

David J. Kappos
*Director of the United States Patent and Trademark Office*